United States Patent

Komazaki et al.

[11] Patent Number: 5,829,306
[45] Date of Patent: Nov. 3, 1998

[54] GEAR SHOCK ABSORBING MECHANISM

[75] Inventors: Yoshiichi Komazaki, Ibaraki-ken; Mitsuyuki Ishikawa, Hitachinaka, both of Japan

[73] Assignee: Hitachi Koki Co., Ltd., Japan

[21] Appl. No.: 759,683

[22] Filed: Dec. 6, 1996

[30] Foreign Application Priority Data

Dec. 8, 1995 [JP] Japan .................................. 7-320452

[51] Int. Cl.$^6$ .................................................. F16H 55/14
[52] U.S. Cl. ........................... 74/411; 464/160; 464/180; 464/185
[58] Field of Search ...................... 74/411, 443; 464/160, 464/180, 185

[56] References Cited

U.S. PATENT DOCUMENTS

| | | | |
|---|---|---|---|
| 1,282,786 | 10/1918 | Entz | 464/160 |
| 1,557,525 | 10/1925 | Hanson | 464/160 |
| 3,320,824 | 5/1967 | Riley, Jr. et al. | 74/443 |
| 4,989,712 | 2/1991 | Janiszewski | 464/160 X |
| 5,033,323 | 7/1991 | Janson | 464/160 X |
| 5,310,021 | 5/1994 | Hightower | 464/160 X |

FOREIGN PATENT DOCUMENTS

| | | | |
|---|---|---|---|
| 56-52658 | 5/1981 | Japan | 464/160 |
| 1-271184 | 10/1989 | Japan . | |

*Primary Examiner*—Allan D. Herrmann
*Attorney, Agent, or Firm*—Rossi & Associates

[57] ABSTRACT

The object of the present invention relates to reduction of noise during no-load running of a gear device and is to provide a gear shock absorbing mechanism, by which it is possible to damp collision force of tooth against tooth by simplified structure and to reduce gear noise. A driven gear is connected to a driven shaft via a radial gap, and a key connects the driven gear with the driven shaft in rotating direction via a peripheral gap, and an elastic member is compressed in axial direction and is placed between a stop washer connected with the driven shaft and the driven gear.

12 Claims, 6 Drawing Sheets

GEAR SHOCK ABSORBING MECHANISM

BACKGROUND OF THE INVENTION

1. [Field of the Invention]

The present invention relates to a gear shock absorbing mechanism for reducing gear noise during no-load running.

2. [Description of the Related Art]

When gears are engaged with each other, unpleasant noise, i.e. the so-called gear noise, is often generated during rotation of gears. Description will be given below on the process to generate noise of a gear mechanism during no-load running, taking an example on a disc grinder, which has a gear mechanism comprising two bevel gears as shown in FIG. 9. Here, it is supposed that a rotating body including an armature 13 with a driving gear 1 on it is a driving rotating body and that a rotating body having a driven gear 2 including a grindstone 14 is a driven rotating body.

In case moment of inertia of the driven rotating body is lower than the moment of inertia of the driving rotating body, the driven rotating body is more likely to rotate irregularly than the driving rotating body due to various factors such as pitch errors of the gears 1 and 2, eccentricity, etc. Because the driven rotating body is rotated irregularly, tooth of the driven gear 2 repeatedly collides and vibrates between teeth of the driving gear 1. Describing this collision phenomenon in more detail by taking notice of one tooth of the driven gear 2, when the tooth of the driving gear 1 collides against the tooth of the driven gear 2, the driven gear 2 is accelerated. It is supposed that the tooth of the driving gear 1 is a tooth A, and that a tooth one step ahead of the tooth A in rotating direction of the driving gear 1 is a tooth B. Because the driving rotating body has higher moment of inertia, even when the driving gear 1 collides, velocity fluctuation is low. On the other hand, the driven rotating body has lower moment of inertia than the driving rotating body, and the accelerated driven gear 2 is rotated at higher speed than the driving gear 1. Therefore, the tooth of the driven gear 2 catches up with the tooth B of the driving gear 1. By this collision, the speed of the driven gear 2 decreases, and it is caught up by the tooth A of the driving gear 1 and collision occurs again. In this way, during no-load running, collision repeatedly occurs in non-steady manner. When gears collide, not only collision noise of the two gears but also impact force caused by the collision are transmitted to the grindstone 14, a housing 15, a wheel guard 16, etc. The noises of vibration are combined together and are emitted as gear noise. In general, it is known that irregularly generated noise is more unpleasant to ears than regularly generated noise. Because the gear noise is generated irregularly, it is very offensive to ears.

During operation, load is applied on the grindstone 14. Even when the driven gear 2 is accelerated by the driving gear 1, it is immediately decelerated due to loading. Accordingly, the tooth of the driven gear 2 never catches up with the forward tooth of the driving gear 1, and gear noise which is heard during no-load running is not generated.

A method to reduce this kind of gear noise has been proposed by Japanese Utility Model Publication 51-88756, in which a gear and a shaft are connected by means of helical spline, key, etc. so that the gear can be slid in axial direction and side of the gear is supported by elastic material such as rubber. When gears collide each other, a component force in axial direction is applied on the gear because of the helical spline. As a result, the rubber material is deformed, and impact force is reduced. However, in case of a gear mechanism with the above arrangement, a force in axial direction is applied on the rotating shaft. Thus, burden is applied on bearing, and service life of the bearing is shortened. Also, in order to reduce impact force sufficiently, the elastic material must have larger axial dimension. As a result, the gear mechanism must be designed in larger size. Further, engaging position changes due to sliding of gears, and deviated or uneven wearing occurs on tooth surface.

As an example practiced in the past, there is a gear mechanism, in which gear is connected to a shaft with a radial gap between them, and a key is arranged with a peripheral gap using it as a lock member for preventing the gear from rotating with respect to the shaft. In the above case, however, torque between the gear and the shaft is transmitted only by the key. Thus, excessive load is applied on the key during starting or stopping, and the key is worn out much earlier.

SUMMARY OF THE INVENTION

It is an object of the present invention to eliminate the problems of the conventional technique as described above and to provide a gear shock absorbing mechanism designed in simplified structure and with lower noise.

The above object is attained by a mechanism, in which a lock member is arranged between a shaft and a gear to allow some movement in rotating direction, the gear is pushed in axial direction by an elastic member in such manner that a part of the gear is pressed by a part of the shaft and is slidably supported in rotating direction.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
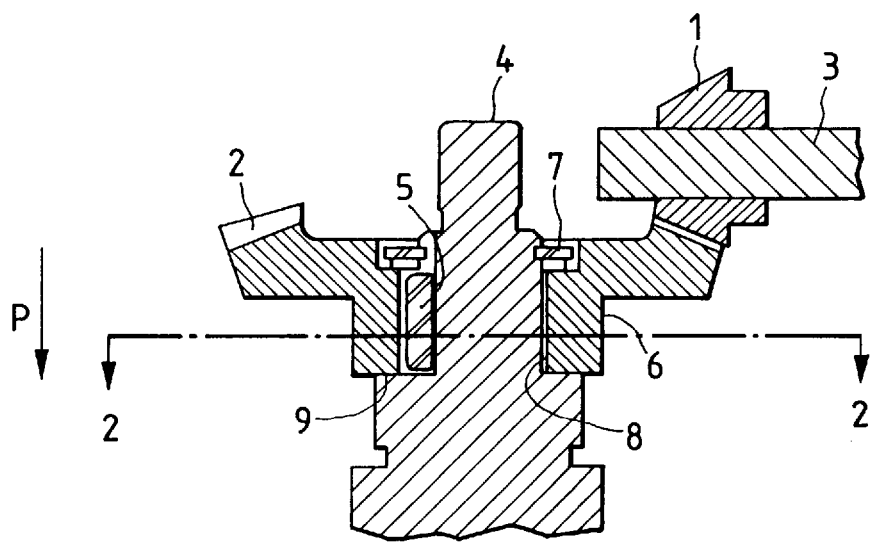
FIG. 1 is a cross-sectional view of an embodiment of a gear shock absorbing mechanism according to the present invention.
Figure 2:
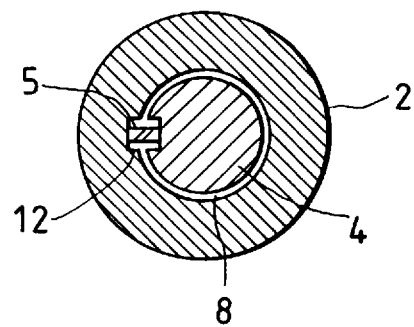
FIG. 2 is a cross-sectional view along the line 2—2 in FIG. 1.

Taking an example in a structure of a gear mechanism of bevel gears used in a disc grinder, a cross-sectional view of a gear mechanism, which is an embodiment of the present invention, is shown in FIG. 1. Here, a motor to generate driving force and a support mechanism for a driven shaft 4 are not shown. A driving gear 1 is forcibly placed into a driving shaft 3, on which driving force from an electric motor (not shown) is applied, and the driving gear 1 is integrally rotated with the driving shaft 3. A driven gear 2 engaged with and driven by the driving gear 1 is connected with a driven shaft 4 via a radial gap 8, and an elastic member 6 is compressed in axial direction and is placed between a stop washer 7 connected with the driven shaft 4 and the driven gear 2. Therefore, the position of the driven gear 2 in axial direction is fixed by pressing the driven gear 2 against a graded step 9 of the driven shaft 4 and by arranging the elastic member 6 between the stop washer 7 connected with the driven shaft 4 and the driven gear 2. Specifically, the driven gear 2 is pushed in a direction shown by an arrow P in FIG. 1. FIG. 2 is a cross-sectional view along the line A—A of FIG. 1 and shows that a key 5 is mounted via a peripheral gap 12 and serves as a lock member for the driven gear 2 and the driven shaft 4.

Figure 7:
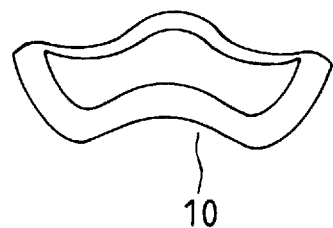
FIG. 7 is a perspective view of an example of an elastic member, which is included in the gear shock absorbing mechanism of the present invention.
Figure 8:
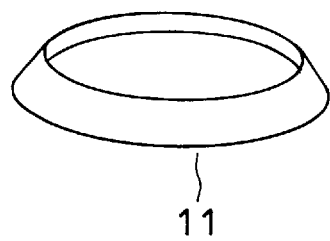
FIG. 8 is a perspective view of another example of an elastic member, which is included in the gear shock absorbing mechanism of the present invention.
Figure 9:
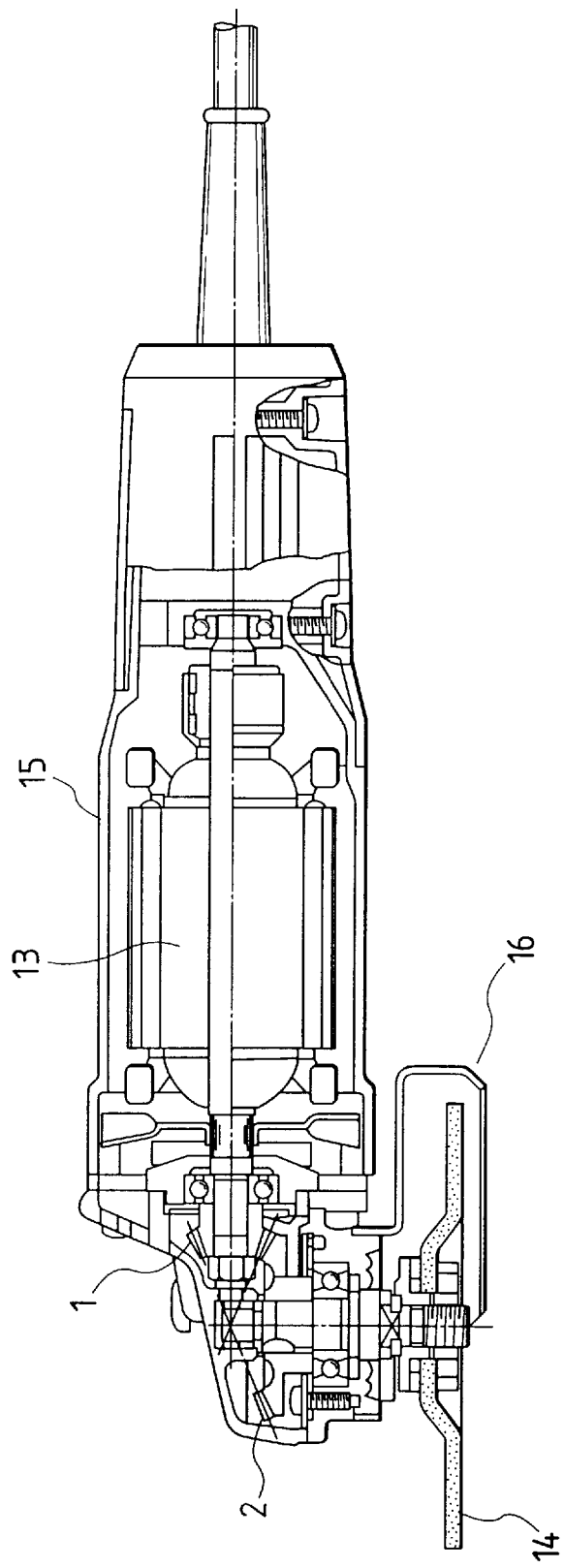
FIG. 9 is a partial front sectional view of an example of a disc grinder, to which the present invention is applied.

In the gear shock absorbing mechanism with the above arrangement, when impact force of the collision between tooth of the driving gear 1 and tooth of the driven gear 2 is small, the driven gear 2 is integrally rotated with the driven shaft 4 by statical friction force, which is generated on contact surfaces between the driven gear 2 and the graded step 9 and between the driven gear 2 and the elastic member 6. In case the impact force is higher than the above statical friction force, the driven gear 2 slides along a distance of the peripheral gap 12 with respect to the driven shaft 4. In this case, dynamic friction force generated on contact surfaces between the driven gear 2 and the graded step 9 and between the driven gear 2 and the elastic member 6 is applied on the driven gear 2. That is, the above impact force is damped by the dynamic friction force, and noise is reduced, which is generated by collision of gear surfaces and by vibration of the grindstone 14 caused by impact. Collision of tooth surfaces occurs alternately on front tooth surface and rear tooth surface. Thus, the sliding direction is alternately changed to normal rotating direction and reverse rotating direction, and deviation of the driven gear 2 to the driven shaft 4 does not become an issue, and the peripheral gap 12 for sliding is maintained at all times. In case the torque between the gear and the shaft is transmitted by the key only, excessive load is applied on the key during starting and stopping, and the key is worn out much earlier. In the present invention, however, the driven gear 2 is pushed in axial direction by the elastic member 6 in addition to the key 5 and is slidably supported in rotating direction. As a result, early wearing of the key 5 can be prevented. In addition, it is designed in simplified structure, and the increase of production cost is trivial. Instead of the key 5, a lock member such as spline may be arranged via the peripheral gap 12, or a wave washer 10 or a disc spring 11 as shown in FIG. 7 or FIG. 8 or any elastic member such as rubber may be selected as the elastic member 6.

Figure 3:
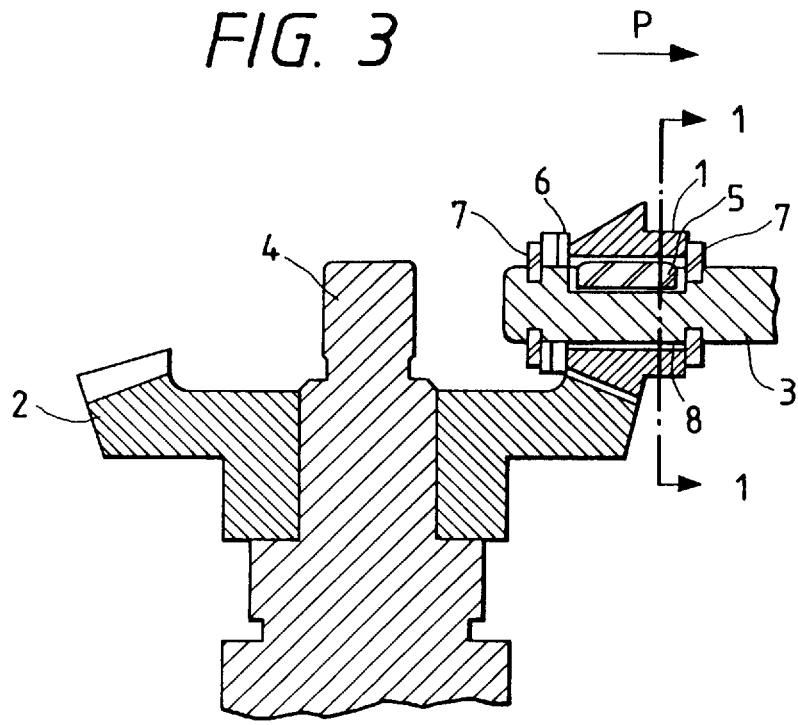
FIG. 3 is a cross-sectional view of another embodiment of the gear shock absorbing mechanism according to the present invention.
Figure 4:
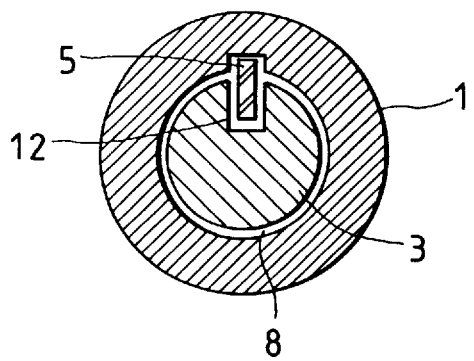
FIG. 4 is a cross-sectional view along the line 4—4 in FIG. 3.

The effect of the present invention can be obtained by applying it at least to either of the driving shaft 3 and the driving gear 1 or to the driven shaft 4 and the driven gear 2. FIG. 3 shows another embodiment of the present invention, in which the invention is applied to the driving shaft 3 and the driving gear 1. The driven gear 2 is forcibly placed into the driven shaft 4, and the driven gear 2 is integrally rotated with the driven shaft 4. The driving gear 1 is connected to the driving shaft 3 via the radial gap 8, and the elastic member 6 is compressed in axial direction and is placed between the stop washer 7 connected with the driving shaft 3 and the driving gear 1. Therefore, the position of the driving gear 1 in axial direction is fixed by pressing the driving gear 1 against the stop washer 7 connected with the driving shaft 3 and by arranging the elastic member 6 between the stop washer 7 connected with the driving shaft 3 with respect to the driving gear 1 and the driving gear 1. Namely, the driving gear 1 is pushed in a direction shown by an arrow P in FIG. 3. FIG. 4 is a cross-sectional view along the line B—B of FIG. 3, and a key 5 is arranged via the peripheral gap 12 as a lock member for the driving gear 1 and the driving shaft 3. In case impact force is generated on tooth surface, the driving gear 1 slides along a distance of the peripheral gap 12 with respect to the driving shaft 3. In this case, dynamic friction force, generated on contact surfaces between the driving gear 1 and the stop washer 7 and between the driving gear 1 and the elastic member 6, is applied on the driving gear 1. Specifically, the above impact force is damped by dynamic friction force, and noise is reduced.

Figure 5:
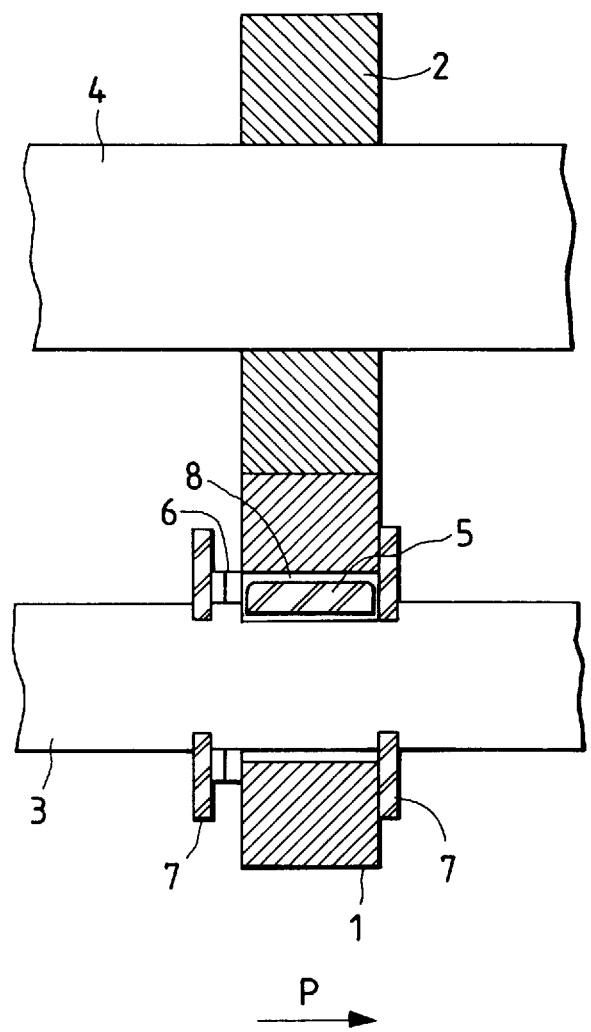
FIG. 5 is a cross-sectional view of still another embodiment of the gear shock absorbing mechanism of the present invention.
Figure 6:
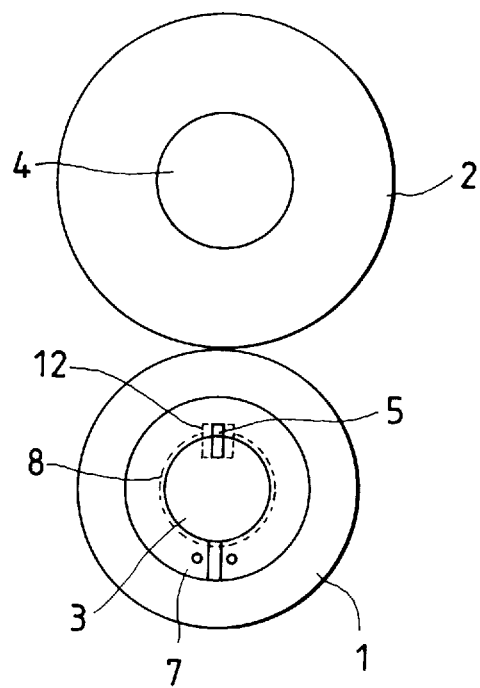
FIG. 6 is a side view of the embodiment of FIG. 5.

Further, the present invention can be applied, not only to the gear mechanism of bevel gears as described above but also to gear mechanism of spur gear or helical gear. FIG. 5 shows an example of another embodiment of the invention where the invention is applied to spur gear. The driven gear 2 is forcibly placed into the driven shaft 4, and the driven gear 2 is integrally rotated with the driven shaft 4. The driving gear 1 is connected to the driving shaft 3 via the radial gap 8, and the elastic member 6 is compressed in axial direction and is placed between the stop washer 7 connected with the driving shaft 3 and the driving gear 1. Therefore, the position of the driving gear 1 in axial direction is fixed by pressing the driving gear 1 against the stop washer 7 connected with the driving shaft 3 and by arranging the elastic member 6 between the stop washer 7 connected with the driving shaft 3 with respect to the driving gear 1 and the driving gear 1. Namely, the driving gear 1 is pushed in a direction shown by an arrow P in FIG. 5. FIG. 6 is a side view of the embodiment of FIG. 5, and a key 5 is arranged via a peripheral gap 12 as a lock member for the driving gear 1 and the driving shaft 3.

Figure 10:
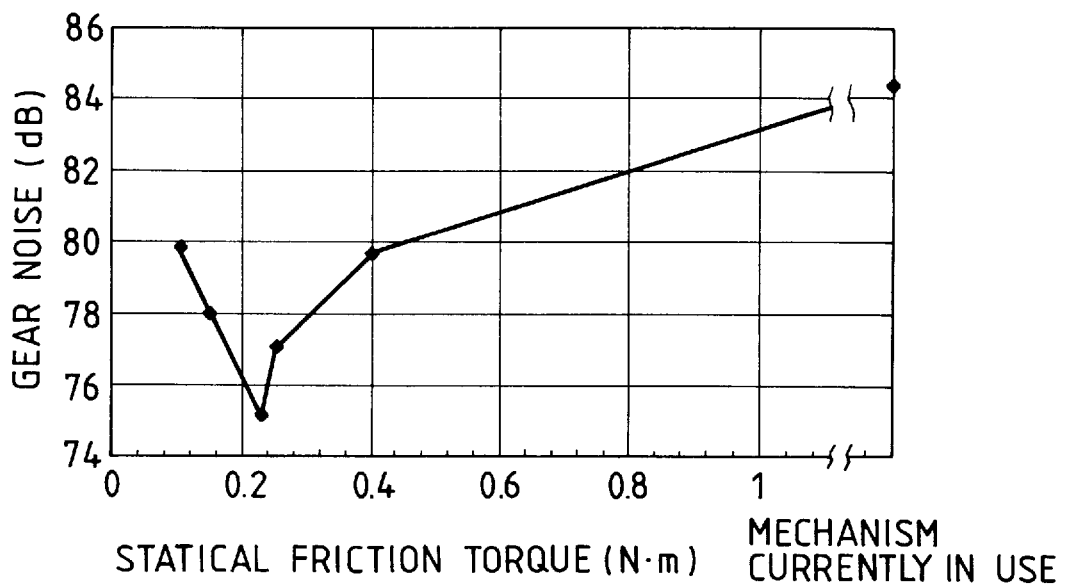
FIG. 10 is a graph showing relationship between statical friction torque given by the elastic member and gear noise.

FIG. 10 is a graph showing relationship between statical friction torque given by the elastic member 6 and gear noise. The invention was applied to a disc grinder (Hitachi; PDA-100D), and gear noise was measured. Gear noise was 84.3 dB before the present invention was applied.

From FIG. 10, it is evident that gear noise is at the lowest when statical friction torque is 0.225, that gear noise is less than 80 dB when statical friction torque is 0.1–0.4, and that gear noise is 80 dB or more when statical friction torque is 0.4 or more.

Figure 11:
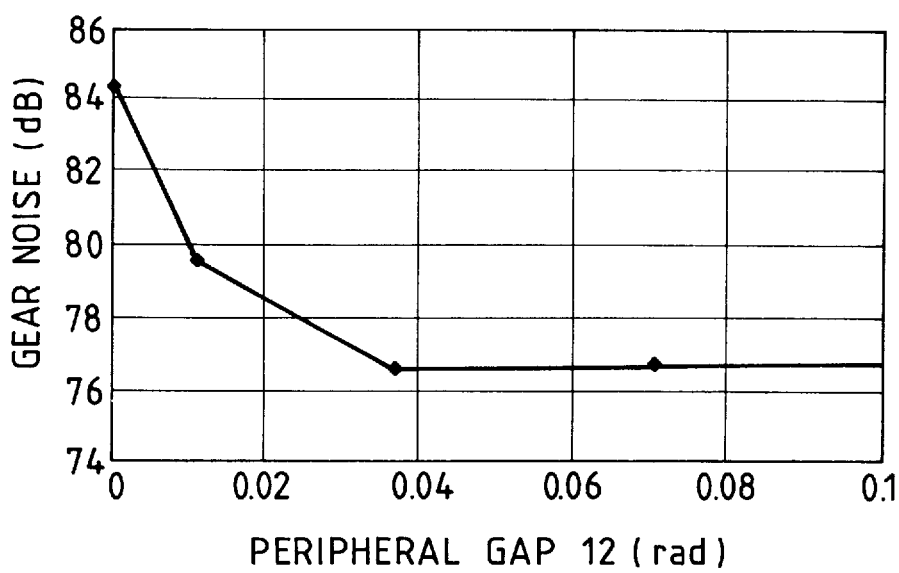
FIG. 11 is a graph showing relationship between peripheral gap and gear noise when the above statical friction torque is set to a predetermined value.

FIG. 11 is a graph showing relationship between the peripheral gap 12 and the gear noise when the above statical friction torque is 0.225, and it is evident from the figure that gear noise is at the highest when the gap 12 is 0, and that gear noise is reduced to the lowest value when the gap 12 is 0.04 (rad) or more.

In FIG. 2 of Japanese Utility Model Publication 56-94259, an arrangement similar to the gear shock absorbing mechanism of the present invention is described. In this arrangement, a gear and a shaft are connected together so that the gear is moved freely in rotating direction with respect to the shaft, and a friction clutch disc forcibly placed into the shaft is pressed on the gear by spring, and the gear is slidably supported in rotating direction with respect to the shaft. This structure is to make gear run idle to the shaft so that excessive load is not applied on the motor, for example, when heavy load is applied on spindle such as the case where the disc grinder is pressed against the workpiece by excessive force. Therefore, in normal grinding operation, the friction clutch disc is pressed against the gear by strong spring force so that the gear and the shaft do not run idle, and the gear does not slide with respect to the shaft even by force of collision between teeth. Because impact force is not damped, there is no effect to reduce gear noise. Unlike the present invention, there is no lock member in the above arrangement. If spring force is reduced to damp collision force between tooth surfaces, gear runs idle during grinding operation, and it is not possible to grind. Therefore, it is different from the present invention in object, structure and effect.

As an invention to reduce noise during no-load running as in the present invention, an arrangement is proposed by Japanese Patent Publication Laid-Open 1-271184. In this invention, a load shaft (corresponding to the driven shaft in the present invention) where tools such as grindstone are mounted is connected to a gear (corresponding to the driven gear in the present invention) via a spline, and an elastic member to connect the load shaft and the gear is provided by engaging via the spline of the load shaft and the spline on outer periphery of the gear. As a result, noise which increases due to backlash on the spline connection is reduced. This is apparently different from the present invention, in which noise generated by collision of the driving gear and the driven gear is reduced. In the invention of Japanese Patent Publication Laid-Open 1-271184, load shaft, gear and elastic member are connected via spline respectively, and gear does not slide with respect to the load shaft, and this invention is different from the present invention from structural viewpoint.

As described above, it is possible according to the present invention to reduce noise generated from the gear shock absorbing mechanism during no-load running.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A gear shock absorbing mechanism, comprising:

rotating shaft;

a gear mounted on said rotating shaft, wherein said gear includes teeth that are directly engaged with teeth of another gear;

a lock member arranged between said rotating shaft and said gear and for maintaining said rotating shaft and said gear in such manner that said gear is allowed to move in a rotating direction to some extent with respect to said rotating shaft and that said gear is not rotated by more than a given angle with respect to said rotating shaft; and an elastic member for pushing said gear in an axial direction so that a part of said gear is pressed on a part of said rotating shaft, and said gear and said shaft are mutually supported by friction and slidable supported.

2. A gear shock absorbing mechanism according to claim 1, wherein said elastic member is a wave washer.

3. A gear shock absorbing mechanism according to claim 1, wherein said elastic member is a disc spring.

4. A gear shock absorbing mechanism according to claim 1, wherein said elastic member is rubber.

5. A gear shock absorbing mechanism, comprising:

a driving gear mounted on a driving shaft, wherein said driving gear includes a plurality of teeth;

a driven gear mounted on a driven shaft, wherein the driven gear includes teeth that are engaged with the teeth of said driving gear;

a lock member arranged between said driving shaft and said driving gear and for maintaining said driving shaft and said driving gear in such manner that said driving gear is allowed to move in a rotation direction to some extent with respect to said driving shaft and that said driving gear is not rotated by more than a given angle with respect to said driving shaft; and an elastic member for pushing said driving gear in an axial direction so that a part of said driving gear is pressed on a part of said driving shaft and said driving gear and said driving shaft are mutually supported by friction and slidable supported.

6. A gear shock absorbing mechanism according to claim 5, wherein said elastic member is a wave washer.

7. A gear shock absorbing mechanism according to claim 5, wherein said elastic member is a disc spring.

8. A gear shock absorbing mechanism according to claim 5, wherein said elastic member is rubber.

9. A gear shock absorbing mechanism, comprising:

a driving gear mounted on a driving shaft, wherein said driving gear has a plurality of teeth;

a driven gear mounted on a driven shaft, wherein said driven gear includes teeth that are engaged with the teeth of said driving gear;

a lock member arranged between said driven shaft and said driven gear and for maintaining said driven gear and said driven shaft in such manner that said driven gear is allowed to move in a rotating direction to some extent with respect to said driven shaft, and that said driven gear is not rotated by more than a given angle with respect to said driven shaft; and an elastic member for pushing said driven gear in an axial direction so that a part of said driven gear is pressed on a part of said driven shaft and said driven shaft and said driven gear are mutually supported by friction and slidably supported.

10. A gear shock absorbing mechanism according to claim 9, wherein said elastic member is a wave washer.

11. A gear shock absorbing mechanism according to claim 9, wherein said elastic member is a disc spring.

12. A gear shock absorbing mechanism according to claim 9, wherein said elastic member is rubber.

* * * * *